(12) United States Patent
Chapman et al.

(10) Patent No.: US 8,407,348 B2
(45) Date of Patent: *Mar. 26, 2013

(54) MONITORING NETWORK USAGE

(75) Inventors: Steve Taylor Chapman, Nottingham (GB); Mark Andrew Read, Derby (GB)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 13/195,219

(22) Filed: Aug. 1, 2011

(65) Prior Publication Data
US 2011/0289211 A1    Nov. 24, 2011

Related U.S. Application Data

(62) Division of application No. 12/279,628, filed on Apr. 1, 2009, now Pat. No. 8,015,291.

(30) Foreign Application Priority Data

Feb. 17, 2006 (GB) .................................. 0603150.4

(51) Int. Cl.
*G06F 15/16* (2006.01)
*G06F 12/00* (2006.01)

(52) U.S. Cl. ........................................................ 709/226
(58) Field of Classification Search .......... 709/223–229, 709/220–221, 250
See application file for complete search history.

(56) References Cited

U.S. PATENT DOCUMENTS

| 7,082,463 | B1* | 7/2006 | Bradley et al. ................ 709/223 |
| 7,467,192 | B1* | 12/2008 | Lemler et al. ................ 709/223 |
| 8,015,291 | B2* | 9/2011 | Chapman et al. ............ 709/226 |
| 2009/0222556 | A1* | 9/2009 | Chapman et al. ............ 709/224 |

* cited by examiner

Primary Examiner — Zarni Maung
(74) Attorney, Agent, or Firm — Coats & Bennett, P.L.L.C.

(57) ABSTRACT

A method of determining whether a user has complied with a service level agreement (SLA) with a network operator, comprising collecting a set of data values representative of the user's service usage and comparing the set of data values to the service level agreement. The data values collected provide the operator with sufficient information so that it can determine whether a SLA is being complied with and to plan provision of network services. A method of monitoring a user's usage of a network service and a service usage indicator is also disclosed.

17 Claims, 2 Drawing Sheets

MONITORING NETWORK USAGE

RELATED APPLICATIONS

This application is a divisional application of U.S. application Ser. No. 12/279,628 filed Aug. 15, 2008, which is a National Stage application claiming priority from PCT/EP2007/051513 filed Feb. 16, 2007, and from foreign application serial no. GB 0603150.4 filed Feb. 17, 2006. This divisional application claims priority from each of the '628 application, the '150.4 application, and the '513 application, and incorporates the contents of each of these applications herein by reference in their entirety.

FIELD OF THE INVENTION

This invention relates to a method for monitoring service usage of a network to enable the network traffic distribution over time to be obtained, and a system and software for carrying out the method. The invention particularly relates to the monitoring of service usage in Ethernet transport networks.

BACKGROUND

An Ethernet network operator supplies connections across their Ethernet transport network to a customer (hereinafter referred to as the user). When a user buys a connection they will typically negotiate a Service Level Agreement (SLA), which defines various parameters and limits of the connection. For example, the following elements may be defined. The Committed Information Rate (CIR), which is the average data bandwidth in Mbits/s that is guaranteed to be transported. The Peak Information Rate (PIR), which is the average peak information rate in Mbits/s that is available between the various users. The Committed Burst Size (CBS), which is specified in bytes and denotes the maximum number of bytes available for a burst of ingress data at the UNI (User to Network Interface) speed to remain CIR conformant. The Peak Burst Size (PBS), which is specified in bytes and denotes the maximum number of bytes available for a burst of ingress data at the UNI speed to remain PIR conformant.

Hereinafter the network connection provided by the network operator to a user will be referred to as the service.

It is highly desirable that the network operator is able to obtain an accurate and representative historical record of the user's service usage with respect to the SLA. Such information would allow the network operator to determine when a user has breached their SLA and would also allow the operator to manage their network effectively.

There are known monitoring systems that gather statistics with respect to the utilisation of a physical link. However, these systems only provide a value representing the average utilisation over a defined period of time. These systems are useful in certain circumstances, although they do not provide information of sufficient detail or resolution to allow the network operator to determine whether the user is adhering to the SLA.

Ideally the network operator wants to have a continuous record of the utilisation of the service imposed by the user sampled every few seconds. However, as a network operator must supply services to a multitude of distinct customers, such an approach would exert an exorbitant cost on the operator in terms of memory requirements.

SUMMARY

According to a first aspect of the invention, we provide a method of determining whether a user has complied with a service level agreement with a network operator, comprising the steps of;
  obtaining a recording period;
  collecting a set of data values representative of the user's service usage over the recording period; and
  comparing the set of data values to the service level agreement.

The data values collected over the recoding period provide the operator with sufficient information so that it can determine whether a SLA is being complied with. Thus, the operator can establish whether the service usage of the user is within the limits specified in the SLA using the data values, which can also be useful to the operator for the planning of network services.

Preferably the set of data values include measures of the length of time that predetermined service usage characteristics occur. Preferably the set of data values include records of the number of times predetermined service usage characteristics occur. Thus, a network operator can define a set of usage characteristics, which are measured by a set of data values, and can be used to represent the actual service usage. Thus minimal memory is required for the operator to determine a user's service usage as it is represented by the data values. The characteristics measured by the data values may be as follows.

Preferably the data values collected include an activity count, which is a measure of the length of time that the service was considered active. Preferably, the service is determined as being active by comparing the present activity to a predefined activity threshold value.

Preferably the data values collected include an utilisation statistic, which represents the average loading of the service during the time that the service was considered active.

Preferably the data values collected include a saturation sampling period count, which is the length of time in which service was saturated. This is preferably obtained by determining the length of time that the user's usage equals or exceeds a predefined saturation threshold.

Preferably the data values collected include an overloaded sampling period count, which represents the length of time that the service was considered to be overloaded. Preferably, the service being overloaded is defined as where the user's usage uninterruptedly equals or exceeds a predefined saturation threshold for a period of time equal or greater than an overload threshold value Preferably the data values collected include a start of overloaded period count, which is a record of the number of times that the service entered an overloaded state.

Preferably the data values collected include the length of time of the recording period.

Preferably the length of time of each of the above data values is acquired in terms of a number of sampling periods. Preferably, the sampling period is equal to one second.

Optionally, the method includes the step of modifying the SLA so that it complies with the data values. Thus, the method can be used to determine and formulate a more appropriate SLA for the user. The method may also include the step of modifying the service or network in accordance with the data values to improve service efficiency.

According to a second aspect of the invention, we provide a method of monitoring a user's usage of a network service comprising the steps of;
  obtaining an activity threshold value;

obtaining a saturation threshold value;
obtaining a recording period;
recording the following data values;
a measure of the length of time that the service was considered active using the activity threshold value;
a measure of the average loading of the service during the time that the service was considered active using the activity threshold value;
a measure of the length of time in which the service was considered saturated using the saturation threshold value.

The present method allows a useful and effective representation of usage of a network or service to be derived while using a minimal amount of memory. Thus, a network operator can accurately determine how the service is being used to effectively plan and manage network resources according to service load over time. The method can also be used to determine whether a user is complying with their SLA. The activity threshold can be used to ensure that only service traffic initiated by the user is used in the collation of the data values and network management traffic is ignored. The use of a saturation threshold enables the operator to determine when the service is reaching or has reached its capacity.

Preferably the method includes obtaining a set of overload parameters and recording a measure of the length of time that the service was considered to be overloaded using the saturation threshold value and the overload parameters.

Preferably, the method includes obtaining a record of the number of individual times that the service was considered overloaded.

Preferably the method includes the step of modifying the user's SLA so that the user's actual service usage complies with it. Thus, the method provides means to monitor and update a service level agreement so to better accommodate the user's service usage. The method may include the step of modifying the network in accordance with the data values to make it more efficient depending upon the usage of the various users. Modifying may include increasing or decreasing bandwidth over portions of the network depending on usage, installing routers, switches or additional connections to improve the flow of data and load over the entire network, for example.

Preferably the method is performed over a predetermined recording period, at the end of which the data is recorded. Preferably the method is repeated over several consecutive recording periods. Preferably a sampling period is defined wherein the data values are extracted or determined each sampling period. The recording period is preferably set as a multiple of the sampling period. Thus, if the sampling period is one second and the recording period is set to 900, then the data values obtained by the method of the invention will be recorded every fifteen minutes.

According to a third aspect of the invention, we provide a service usage indicator comprising an input means to receive an activity threshold value, a saturation threshold value and a recording period value, and data collection means to record the following data values of a service;
a measure of the length of time that the service was considered active using the activity threshold value;
a measure of the average loading of the service during the time that the service was considered active using the activity threshold value;
a measure of the length of time in which the service was considered saturated using the saturation threshold value.

Preferably the service usage indicator is software, although it may be hardware.

Preferably the service usage indicator is located on a computer server of a network operator.

Preferably the input means is also adapted to obtain a set of overload parameters and the data collection means is adapted to also record a measure of the length of time that the service was considered to be overloaded using the saturation threshold value and the overload parameters.

Preferably, the data collection means also obtains a record of the number of individual times that the service was considered overloaded.

Preferably the service usage indicator includes means to modify a user's SLA or modify the network as discussed in relation to the first or second aspects of the invention.

BRIEF DESCRIPTION OF THE DRAWINGS

There now follows, by way of example only, a detailed description of an embodiment of the invention with reference to the accompanying drawings, in which.

DETAILED DESCRIPTION

Figure 1:
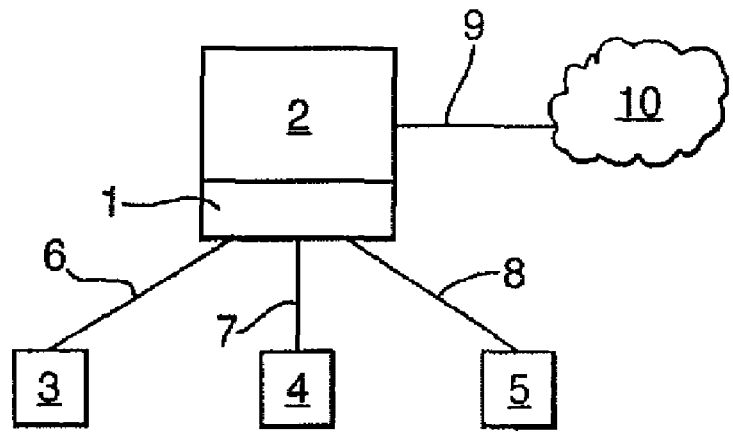
FIG. 1 shows a diagrammatic view of an embodiment of the present invention.

In the embodiment of the Figures an Ethernet transport network operator uses the method of the invention to monitor the service traffic distribution of a user over time. The user would typically have agreed to a Service Level Agreement (SLA) with the network operator and this method provides means to determine whether the user has adhered to the SLA. Thus, using a minimal amount of collected data, the network operator can re-create the service traffic distribution for that user for analytical purposes. This allows accurate service performance monitoring using minimal memory and network resources.

The method of the invention is carried out by means (1) such as software located on a server (2) of an Ethernet service operator. The operator provides network connections or services (6,7,8) to a plurality of users (3,4,5). The server (2) may have other connections (9) that may or may not be accessible to the users (3,4,5), to the Internet (10), for example. The software (1) is used to extract various parameters that are indicative of each user's service usage. The following embodiment describes the method of the invention with respect to one user (3).

As is known, the user (3) will use the Ethernet service (6) by transmitting and receiving data in the form of packets across it. The network operator, in accordance with the invention, uses the software (1) to obtain information regarding usage of the service. The amount and resolution of the data collected is determined by a predetermined sampling period and recording period. The sampling period is the period over which the usage figures are sampled. In the present embodiment, the sampling period is set to 1 second. The recording period is the number of sampling periods that are used to compile a single record of service usage for storage by the operator for later analysis. In the present embodiment, the recording period is set to 86400 sampling periods and thus a recording period will represent the service usage over a 24 hour period. Using the predetermined sampling and recording periods the following statistics or counts are collected over the recording period.

An activity count (ACTV) is a measure of the length of time that the service was considered active. To calculate an active sampling period, or in this embodiment an active second, an activity threshold is defined by the operator, which is used to determine if the period should be deemed active or inactive. The activity threshold is measured in numbers of packets and is used to filter out packets that are used by the operator to manage the service, such as Bridge Protocol Data Units and Operations and Administration packets. Thus, the activity threshold is typically set to the average number of management packets that are transported by the service per sampling period. The activity count ACTV is therefore only incremented when the number of packets monitored is greater than or equal to the activity threshold and thus an active sampling period is declared. Therefore, the activity count is representative of the number of sampling periods within which packets containing data of the user (3) were transported by the service.

An utilisation statistic (UTIL) is derived from measuring a raw utilisation of the service each sampling period, which is then averaged on an ongoing basis over the recording period. The utilisation statistic represents the average loading during the time that the service was considered active over the recording period. Raw utilisation is calculated as a percentage of the bandwidth of the service used against that which is actually available each sampling period.

A saturation sampling period count (SAT) is defined as the number of sampling periods in which the raw utilisation equals or exceeds a predefined saturation threshold. The saturation threshold is a percentage and represents the raw utilisation at which the operator considers the service saturated. Thus, each sampling period, if the raw utilisation equals or exceeds the saturation threshold then the SAT count is incremented and then stored for later analysis at the end of the recording period.

An overloaded sampling period count (OVER) represents the number of sampling periods in which the service was considered to be overloaded. A period of overload is entered when the raw utilisation has exceeded the saturation threshold and remains equal to or above it for a predefined period referred to as a start of overload event threshold (SOE). A period of overload ends when the raw utilisation falls below the saturation threshold and remains below it for a predefined period referred to as a termination of overload event threshold (TOE).

Thus, the software (1) is arranged to ensure that the SAT count is not incremented when the service is determined to be in a period of overload. This will ensure that the two counts, SAT and OVER, accurately represent different events in the service traffic distribution.

Figure 2:
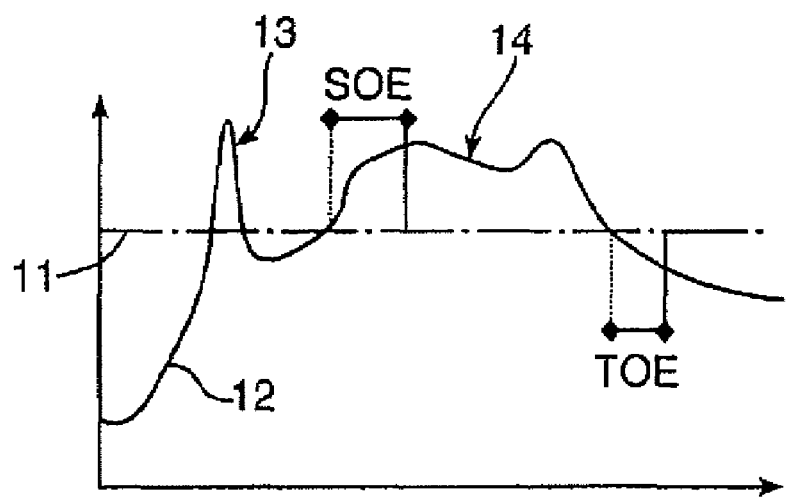
FIG. 2 shows a graph representing the service exceeding a saturation threshold.

FIG. 2 shows a graph of raw utilisation (as a percentage) versus time (in sampling periods, i.e. seconds). The saturation threshold is marked as a dashed line (11). As can be seen, the plot (12) enters a period in which the utilisation exceeds the saturation threshold twice (13 and 14). The first time (13) the utilisation "spiked" for a period and the second time (14) utilisation was saturated for a longer period. Once the saturation threshold has been exceeded a saturated sampling period is declared. The SAT count is incremented by one for each sampling period that a saturated sampling period is declared. The SAT count is only not incremented when a subsequent sampling period is not considered to be a saturated sampling period. If the number of consecutive saturated sampling periods becomes equal to the SOE threshold, then a period of overload is entered. Whilst in the overload state, if the raw utilisation falls below the saturation threshold then an unsaturated sampling period is declared and a count of the number of these is begun. If the raw utilisation remains below the saturation threshold for a period equal to the TOE threshold, then the overload period is terminated.

To ensure that the OVER count is representative of the actual time that the service was overloaded, the SOE threshold period is added to OVER count and the TOE threshold period is subtracted from the OVER count. This is because the OVER count is not incremented until the SOE period has expired, within which time the service is overloaded; and the OVER count is incremented until the TOE period is exceeded, during which time the service is not overloaded. This is discussed in more detail below.

Thus, with reference to FIG. 2, the first time (13) the raw utilisation exceeded the saturation threshold it was not for an uninterrupted period longer than the SOE threshold and thus the service was not considered overloaded and only the SAT count is incremented. The second saturated period (14) was for a period in excess of the SOE threshold and thus service is declared overloaded and the OVER count is incremented accordingly.

A start of overloaded period count (SOPC) is a record of the number of times that the service (6) entered an overloaded state. This count provides the operator with an indication of whether the length of time that the service was overloaded (represented by the OVER count) was continuous or whether it was broken up into a number of separate instances of overload.

In use, the following steps are performed each sampling period. In the subsequent description, the sampling period is defined as being 1 second and thus the various operations are described in terms of seconds. However, it will be appreciated that the sampling period can be set to any figure as appropriate, depending on whatever analysis of service usage or performance the operator wishes to obtain.

Before any of the above defined counts/statistics are incremented or calculated, a raw utilisation figure is extracted each second. The number of packets received in each second is compared to the activity threshold and if greater than or equal to this value an active second is declared. The raw utilisation is compared to the saturation threshold and if it is greater than or equal to this value then a saturated second is declared. Once the above raw data is extracted and determined, the above-defined statistics/counts can be evaluated and incremented as necessary. This is performed as follows.

In order to update the ACTV, UTIL, SAT, OVER and SOPC counts/statistics, three internal counters are used. The first being a consecutive saturated sampling period counter (CSAT), which is used as a record of the number of consecutive sampling periods in which the raw utilisation is equal to or greater than the saturation threshold. Thus, it is reset as soon as the raw utilisation falls below the saturation threshold. The second is a consecutive non-saturated sampling period counter (CnSAT), which is used as a record of the number of consecutive sampling periods in which the raw utilisation is below the saturation threshold. Thus, it is reset as soon as the raw utilisation equals or exceeds the saturation threshold. The third internal counter is a record of the total number of sampling periods (TMP) over which measurements have been made.

Different counts are incremented depending whether the service is overloaded or not overloaded. Thus, the implementation of the method will be described in terms of the actions taken in an overloaded state, non-overloaded state or in either an overloaded or non-overloaded state.

In Either State;
1. Increment the TMP count by 1.
2. The count ACTV shall be incremented by 1 if the second is declared to be active.
3. If the second is declared active, the UTIL statistic shall be calculated in accordance with equation 1.

$$UTIL = \frac{(UTIL*(ACTV-1) + \text{Raw Utilisation})}{ACTV} \quad (1)$$

Not in the Overloaded State;
In addition to the step discussed above, when the service is not overloaded, the following steps are performed.
When the raw utilisation is below the saturation threshold;
1. The internal CSAT counter shall be reset to 0.
When the raw utilisation is equal to or greater than the saturation threshold;
1. The internal CSAT counter shall be incremented by 1.
2. The SAT counter statistic shall be incremented by 1.
If the Internal CSAT counter is greater than or equal to the SOE threshold then a period of overload is entered. The following shall be performed;
1. The internal CSAT counter shall be subtracted from the SAT counter statistic.
2. The OVER counter statistic shall be incremented by the internal CSAT counter.
3. The SOPC counter statistic shall be incremented by 1.
4. The internal CSAT counter shall be reset to 0.
Within the Overloaded State;
1. The OVER counter shall be incremented by 1.
2. If the sampling second has been declared saturated then the following shall be performed;
   2.1. The internal CnSAT counter shall be reset to 0.
3. If the sampling second has not been declared saturated then the following shall be performed;
   3.1 The internal CnSAT counter shall be incremented by 1.
4. If the internal CnSAT counter is greater than or equal to the TOE threshold then the period of overload has ended and the following shall be performed;
   4.1 The internal CnSAT counter shall be subtracted from the OVER count statistic.
   4.2 The internal CnSAT counter shall be reset to 0.
At the end of the recording period, i.e when the TMP count is equal to the predetermined recording period, the ACTV, UTIL, SAT, OVER, SOPC, CSAT, CnSAT and TMP counts/statistics are stored as a record by the operator. A new record is then created and the ACTV, UTIL, SAT, OVER, SOPC and TMP, counts/statistics are reset to 0. The internal counts, CSAT and CnSAT, are not reset and are carried over to the subsequent record.

However, if during the acquisition of a subsequent record (i.e. the now current record) it is found that the overloaded state was entered or exited during the previous record then the statistics/counts in the previous record must be adjusted in order to render them accurate. Thus, the following adjustments should be performed;
1. Should an overload period be declared such that it was entered during the previous record, then the following counts shall need to be adjusted;
   1.1. The OVER count shall be incremented in the previous record by the Internal CSAT count that was compiled during the previous record.
   1.2. The OVER count shall be incremented in the current record by the Internal CSAT count that was compiled during the current record.
   1.3. The SAT count shall be decremented in the previous record by the internal CSAT count that was compiled during the previous record.
   1.4. The SAT count shall be decremented in the current record by the internal CSAT count that was compiled during the current record.
   1.5. The SOPC count shall be incremented by 1 in the previous record.
2. Should an overload period be exited such that it ended during the previous record, then the following counts shall need to be adjusted;
   2.1 The OVER count shall be decremented in the previous record by the internal CnSAT count that was compiled during the previous record.
   2.2 The OVER count shall be decremented in the current record by the internal CnSAT count that was compiled during the current record.

Once the statistics/counts have been obtained and stored and adjusted as necessary, the operator can use this minimal amount of data to reconstruct the service usage distribution of a user.

Figure 3:
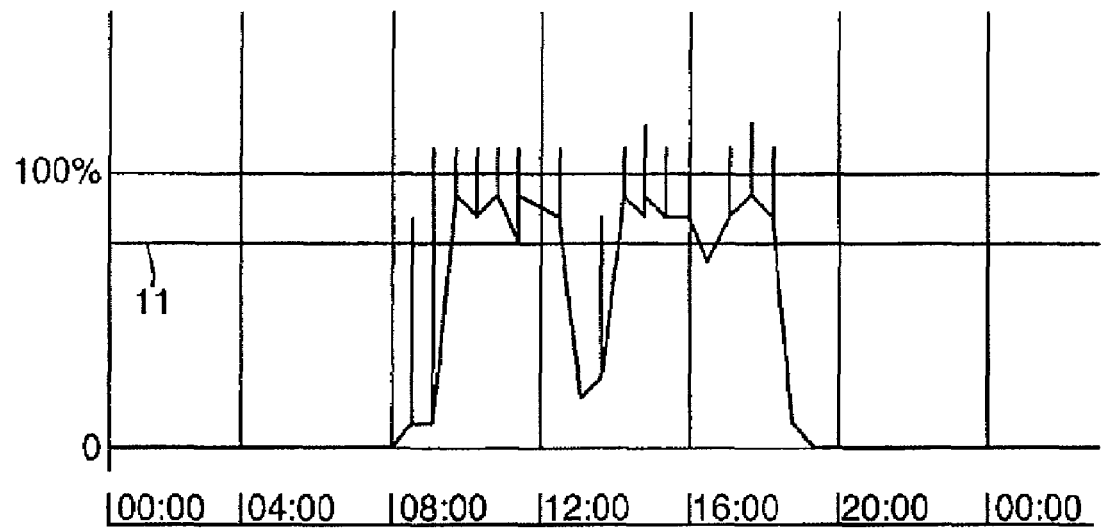
FIG. 3 shows a graph of the service usage of a typical user.

FIG. 3 shows a graph of service usage distribution by a typical business user over a 24-hour period. The time of day over the 24-hour period is marked adjacent the horizontal axis. The horizontal axis represents time in 1-second increments. The vertical axis represents the level of raw utilisation as a percentage. The saturation threshold is marked on the graph as a horizontal line. The graph itself corresponds to the level of service usage when compared to the CIR (as a percentage) that has been agreed with the user in the SLA, for example.

Thus, with reference to FIG. 3, it can be seen that the start of business occurred at around 08:30 and the end of business at approximately 17:00. There is a lull in usage around 13:00. The statistics/count obtained by the above method for the usage shown in FIG. 3 are shown in table 1;

TABLE 1

| Statistic/Count | Value |
| --- | --- |
| UTIL | 68% |
| ACTV | 33067 |
| SAT | 545 |
| OVER | 23400 |
| SOPC | 3 |
| TMP | 86400 |

Figure 4:
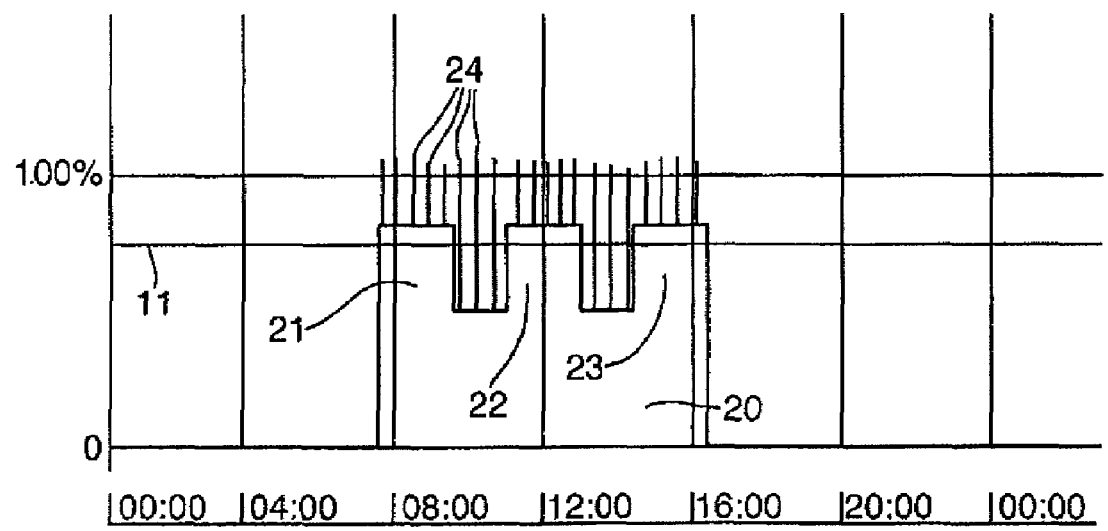
FIG. 4 shows a graph of network utilisation obtained from the data acquired by the method of the invention.

By using only the data in Table 1, the service operator can recreate an approximation of the usage distribution to create a useful representation for analysis. This is shown in FIG. 4.

The ACTV count indicated that the service was active for 38% (=ACTV/TMP) of the recording period. Thus a continuous block (20) is plotted in the centre of the diagram having a width of 33067. The centre of the diagram is chosen as this is not an unreasonable assumption and can be adjusted on acquisition of further data. The SOPC count indicates that there were 3 distinct periods of overload that had a total duration of 27% (=OVER/TMP) of the recording period. These overload periods have been plotted as 3 equally sized blocks (21,22,23) within the active period. The overload blocks will have a width equal to OVER/SOPC i.e. 23400/3 each. The SAT count indicates that there have been up to 545 "spikes" in which the raw utilisation has exceeded the saturation threshold. The average number of sampling periods each "spikes" existed for is not known but could be between 1 sampling period and one sampling period less than the SOE threshold. The operator (2) can make an assumption of this and distribute the spikes (24) evenly over the active period, as shown in FIG. 4.

Thus, it can be seen that a useful representation of service usage distribution can be recreated from a minimal number of counts and statistics: the collection of which does not place an unmanageable burden on the memory or system resources of a network operator. The statistics/counts can be analysed alone or when used to create a graphical representation of usage distribution by the operator. Thus, the operator can accurately determine whether the terms of the SLA are being complied with and use the information to plan the provision of the service.

What is claimed is:

1. A method of monitoring a user's usage of a network service, comprising:
   recording a length of time that a service in the network was considered active relative to a predefined activity threshold value;
   recording an average loading of the network service during the time that the network service was considered active relative to the activity threshold value; and
   recording a length of time in which the network service was considered saturated relative to a predefined saturation threshold value.

2. The method of claim 1 further comprising recording a length of time that the service was considered to be overloaded relative to the predefined saturation threshold value and a predefined set of overload parameters.

3. The method of claim 2 further comprising recording a number of individual times that the service was considered overloaded.

4. The method of claim 1 further comprising:
   deriving a user's actual usage of the network service from the recorded data values; and
   modifying a Service Level Agreement (SLA) between the user and a network operator so that the user's service usage complies with the SLA.

5. The method of claim 1 further comprising modifying the network based on the recorded data values to make it more efficient.

6. The method of claim 1 further comprising:
   monitoring the data values over a predetermined recording period; and
   recording the data values at the end of the predetermined recording period.

7. The method of claim 6 further comprising monitoring the data values and recording the data values over a plurality of consecutive recording periods.

8. The method of claim 6 further comprising:
   defining a sampling period:
   extracting or determining the data values each sampling period.

9. The method of claim 8 wherein the recording period is set as a multiple of the sampling period.

10. A communication network service usage indicator comprising:
    an input configured to receive an activity threshold value, a saturation threshold value, and a recording period value; and
    a data collector configured to record
       a length of time that the service was considered active relative to the activity threshold value;
       an average loading of the service during the time that the service was considered active relative to the activity threshold value; and
       a length of time in which the network service was considered saturated relative to the saturation threshold value.

11. The service usage indicator of claim 10 wherein the service usage indicator is implemented in a software module.

12. The service usage indicator of claim 10 wherein the service usage indicator is implemented as one or more hardware components.

13. The service usage indicator of claim 10 wherein the service usage indicator is located on a computer server associated with a network operator.

14. The service usage indicator of claim 10 wherein the input is further configured to receive a set of overload parameters, and wherein the data collector is further configured to record a length of time that the service was considered to be overloaded relative to the saturation threshold value and the set of overload parameters.

15. The service usage indicator of claim 14 wherein the data collector is further configured to record a number of individual times that the network service was considered overloaded.

16. The service usage indicator of claim 10 wherein the service usage indicator is configured to modify a Service Level Agreement (SLA) between a user of the network service and a network operator based on the recorded data values.

17. The service usage indicator of claim 10 wherein the service usage indicator is configured to modify a communication network based on the recorded data values.

* * * * *